United States Patent [19]

Okano et al.

[11] Patent Number: 4,640,597
[45] Date of Patent: Feb. 3, 1987

[54] MICRO-READER

[75] Inventors: Takeshi Okano, Nishinomiya; Sadaaki Nakaoka, Osaka; Saichiro Ohashi, Otokuni, all of Japan

[73] Assignee: Fuji Photo Film Co., Ltd., Kanagawa, Japan

[21] Appl. No.: 700,157

[22] Filed: Feb. 11, 1985

[30] Foreign Application Priority Data

| Feb. 10, 1984 | [JP] | Japan | 59-23888 |
| Aug. 28, 1984 | [JP] | Japan | 59-131151[U] |
| Aug. 28, 1984 | [JP] | Japan | 59-131154[U] |
| Aug. 28, 1984 | [JP] | Japan | 59-131155[U] |
| Aug. 28, 1984 | [JP] | Japan | 59-131159[U] |

[51] Int. Cl.⁴ .......................................... G03B 21/28
[52] U.S. Cl. .................................... 353/79; 353/101; 353/119
[58] Field of Search .................. 353/74–78, 353/72, 79, 101, 119

[56] References Cited

U.S. PATENT DOCUMENTS

| 2,322,023 | 6/1943 | Hopkins | 353/72 X |
| 2,769,368 | 11/1956 | Bearint | 353/72 |
| 3,173,330 | 3/1965 | Parker | 353/72 |
| 3,314,514 | 6/1967 | Douglas et al. | |
| 3,667,339 | 6/1972 | Artaud | |
| 3,700,331 | 10/1972 | Peters | |
| 3,735,723 | 1/1974 | Peters | |
| 4,432,619 | 2/1984 | Schmidt | 353/79 X |

FOREIGN PATENT DOCUMENTS 3223906 12/1983 Fed. Rep. of Germany .
671930 9/1929 France ................................. 353/75
1340074 12/1973 United Kingdom ................. 353/78

OTHER PUBLICATIONS

Laid Open Japanese Patent Publication No. 59-210429, published Nov. 29, 1984, in Japan and U.S. Application Ser. No. 644,516.

Primary Examiner—Harry N. Haroian
Attorney, Agent, or Firm—Sughrue, Mion, Zinn, Macpeak and Seas

[57] ABSTRACT

A micro-reader which comprises a generally rectangular box-like, flattened casing a slide frame slidably supported by the casing for movement between retracted and extended positions, a light-permeable screen mounted on and supported by the casing for movement between folded and erected positions, and a reflective mirror member carried by the slide frame for movement between laid-down and upright positions. When the micro-reader is not in use with the slide frame, the screen and the mirror member being held in the retracted, folded and laid-down positions, respectively, the screen and the mirror member constitute cover members for covering the top and bottom of a space between the casing and the slide frame, but when the micro-reader is in use with the slide frame, the screen and the mirror member held in the extended, erected and upright positions, respectively, the mirror member confronts the screen at a predetermined angle while lying in a plane different from the plane which is occupied by the mirror member when in the laid-down position.

6 Claims, 27 Drawing Figures

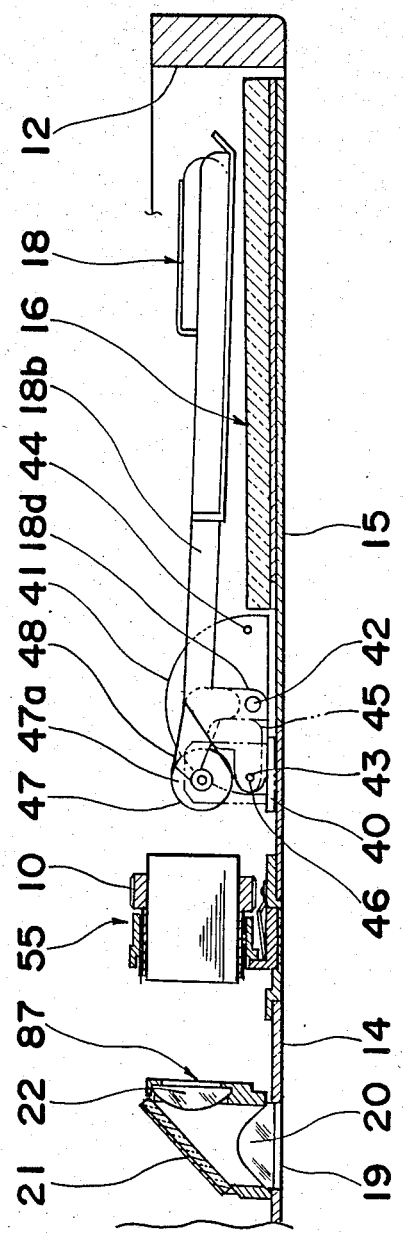
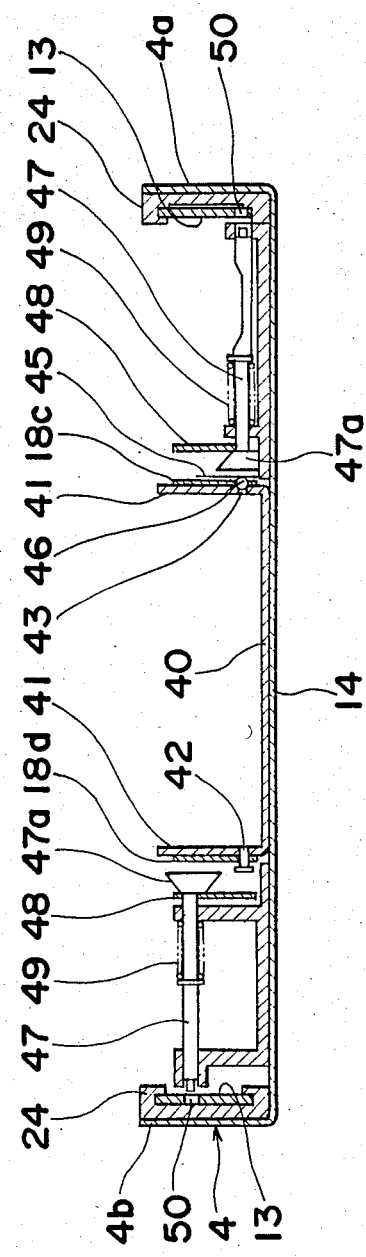
Fig. 7
Fig. 8

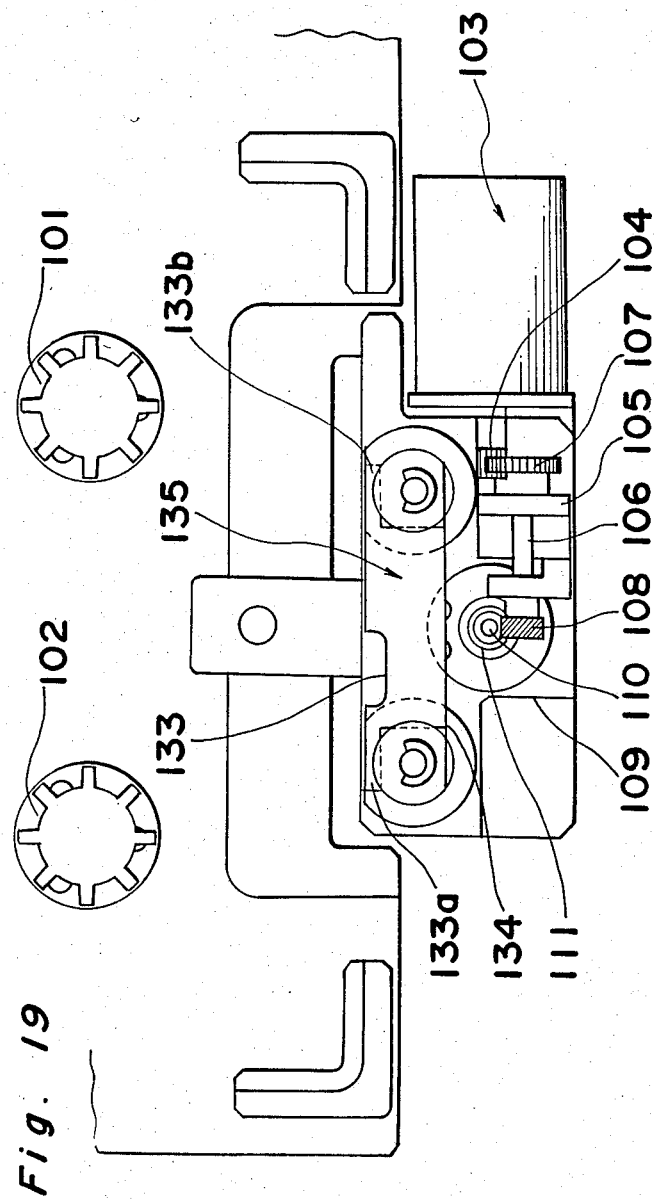
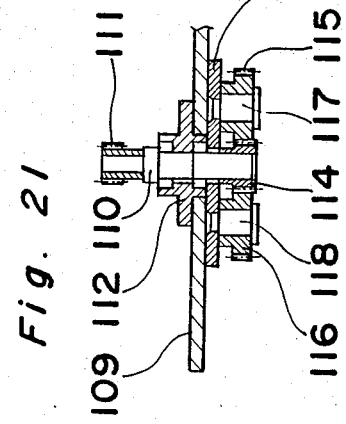
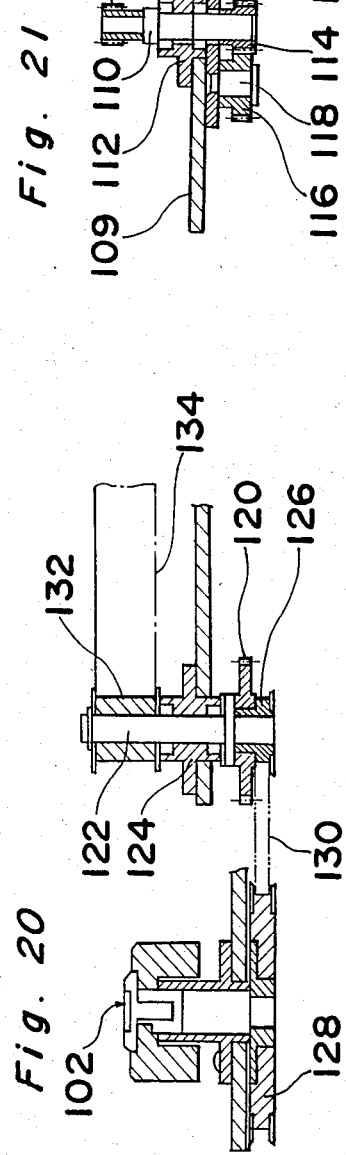
Fig. 19
Fig. 21
Fig. 20

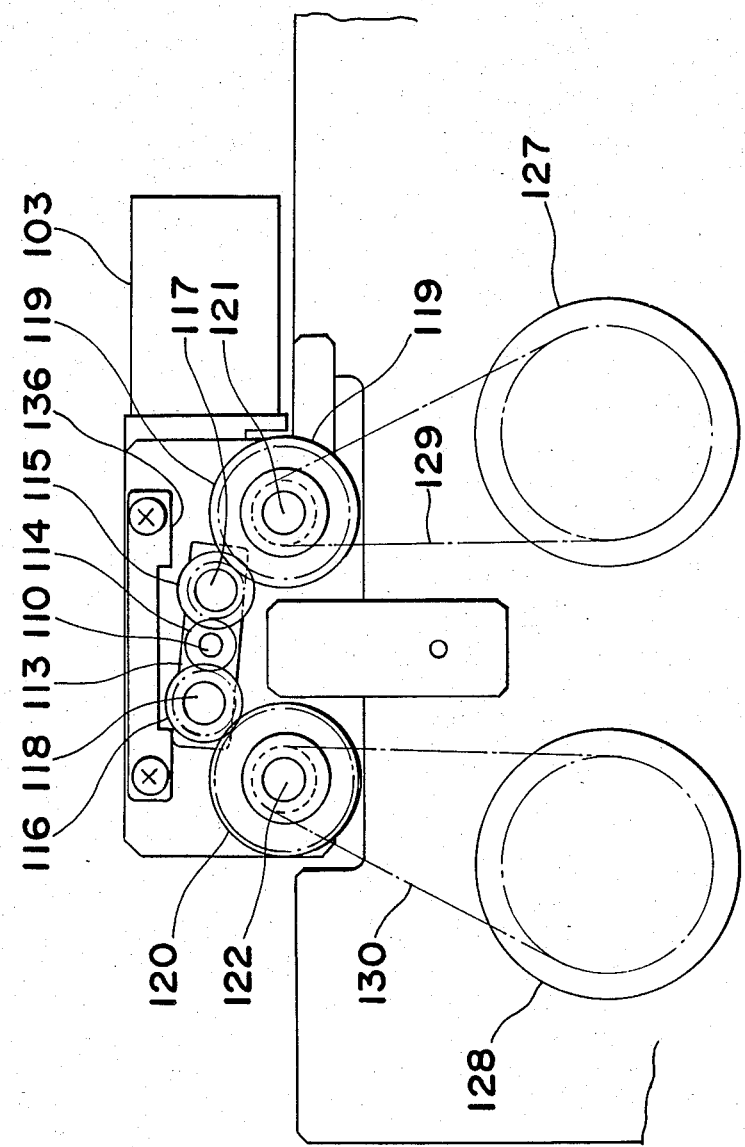

MICRO-READER

BACKGROUND OF THE INVENTION

The present invention relates to a micro-reader for projecting images of information, such as alphanumeric characters and/or graphs, recorded on a microfilm, onto a self-contained viewing screen.

It is largely recognized that the space for the storage of a huge number of documents can advantageously be minimized if the documents are microfilmed. Therefore, in most offices or any other establishments where a large number of documents are handled, a microfilming system is employed. Because the microfilming system is effective to speed up the office documentation and also effective to provide the reproduction of clear images, the microfilming system has gained the lead far ahead of the other recording media.

In such a microfilming system, a device generally called a micro-reader has to be used for reproducing and viewing an image recorded on a microfilm. As is well known to those skilled in the art, the micro-reader requires the provision of an optical system for enlarging each frame of the microfilm to a size corresponding usually to a A-4 sized paper. The provision of such an optical system makes the micro-reader considerably bulky and large in size, and therefore, the place of installation of the micro-reader is usually fixed or limited thereby posing such a problem that it is not readily available for use.

A micro-reader of a type having a foldable screen for the convenience of transportation by hand is currently commercially available, however it is of a size corresponding to or greater than a briefcase and has a considerable weight. Accordingly, even the commercially available micro-reader has a problem in that it can not readily be available at the site where the documentation is performed and immediately when it is needed.

Examples of the other prior art compact micro-readers are disclosed in, for example, the U.S. Pat. Nos. 3,667,839, 3,700,321, 3,785,728, and 3,814,514, and the German Pat. No. 3,223,906.

SUMMARY OF THE INVENTION

Accordingly, the present invention has been developed with a view to substantially eliminating the above discussed disadvantages and inconveniences inherent in the prior art micro-readers and has for its essential object to provide an improved handy micro-reader which is thoroughly rendered so compact and so small in thickness that the micro-reader can be transported readily from place to place and can be contained in a briefcase.

Another important object of the present invention is to provide an improved handy micro-reader of the type referred to above, wherein a reflective mirror for reflecting the incoming imagewise light towards a light-permeable screen is so designed and so supported as to render the micro-reader to be compact and handy when the micro-reader is not in use and as to provide, when it is in use, the optical path of a length necessary to project an image onto the screen on enlarged scale and also an appropriate angle of inclination of the screen relative to the viewing direction.

A further object of the present invention is to provide an improved micro-reader of the type referred to above, wherein a light shield is provided so as to enclose the space between the screen and the reflective mirror, when the micro-reader is in use, thereby to avoid the interference of external light on the imagewise light which would reduce the contrast of the image projected.

A still further object of the present invention is to provide an improved handy micro-reader of the type referred to above, wherein the projecting optical system is so designed as to render the micro-reader as a whole compact and small in size without adversely affecting the length of the optical path necessary to project the image on enlarged scale.

A yet further object of the present invention is to provide an improved handy micro-reader of the type referred to above, wherein a single detent mechanism is provided for locking the screen and a slide frame in respective folded and retracted positions when the micro-reader is not in use and is so designed that one of the screen and the slide frame can be moved to the respective folded or retracted position either before or after the movement of the other of the screen and the slide frame to the respective retracted or folded position.

To this end, in one aspect of the present invention, a micro-reader in which an optical system is utilized for projecting on a screen a magnified reproduction of an image on a microfilm, said micro-reader comprises a generally rectangular box-like, flattened casing; a moveable member supported by the casing for movement between retracted and extended positions in a direction parallel to any one of opposite side walls of the casing; a viewing screen mounted on and supported by the casing for movement between folded and raised positions; an optical system for projecting the image onto the screen; a lamp for illuminating the image on the screen; and a reflecting mirror member supported for movement between laid-down and upright positions for reflecting the imagewise light from the optical system towards the screen when in the upright position and, at the same time, when the screen is held in the erected position, whereby, when the micro-reader is not in use with the moveable member, the screen and the mirror member is held in the retracted, folded and laid-down positions, respectively, said screen and said mirror member constitute cover members for covering the top and bottom of a portion of the space between the casing and the moveable member, but when the micro-reader is in use with the moveable member, the screen and the mirror member held in the extended, raised and upright positions, respectively, the mirror member confronts the screen at a predetermined angle while lying in a plane different from the plane which is occupied by the mirror member when in the laid-down position.

According to another aspect of the present invention, a micro-reader in which an optical system is utilized for projecting on a screen a magnified reproduction of an image on a microfilm, said micro-reader comprises a casing; a moveable member supported by the casing for movement between retracted and extended positions; a viewing screen mounted on and supported by the casing for movement between folded and raised positions; an optical system for projecting the image onto the screen; a lamp for illuminating the image onto the screen; a reflecting mirror member supported for movement between laid-down and upright positions; and a foldable light shield provided for enclosing a space defined between the screen and the mirror member when said screen and said mirror member are held in the raised position and the upright positions, respectively, said light shield comprising a top panel hingedly connected to the top of the screen and having its opposite sides hingedly connected with respective side panels, said top and side panels capable of being folded together about the respective hinges.

According to a further aspect of the present invention, a micro-reader in which an optical system is utilized for projecting on a screen a magnified reproduction of an image on a microfilm, said micro-reader comprises a casing; a moveable member supported by the casing for movement between retracted and extended positions; a viewing screen mounted on and supported by the casing for movement between folded and raised positions, said screen when in the folded position forming a past of the top wall of the casing; said moveable member having a groove defined therein so as to open upwards and also towards the direction in which the slide frame is moved from the extended position towards the retracted position; a detent mechanism projecting into the groove; and an engagement member carried by the screen and capable of being, when the screen is moved to the folded position, inserted into the groove from above, or from the direction conforming to the direction of movement of the slide frame towards the retracted position, to engage the detent mechanism.

BRIEF DESCRIPTION OF THE DRAWINGS

These and other objects and features of the present invention will become readily understood from the following description taken in conjunction with a preferred embodiment thereof with reference to the accompanying drawings, in which:

FIG. 7 is a schematic side sectional view of a portion of the micro-reader, showing the details of a lamp support;

FIG. 8 is a schematic cross-sectional view taken along the line A—A in FIG. 4;

FIG. 19 is a fragmentary top plan view, on enlarged scale, of a film drive mechanism used in the micro-reader;

FIGS. 20 and 21 are fragmentary side sectional views showing the manner in which various gears forming parts of the film drive mechanism are supported;

FIG. 22 is a fragmentary bottom plan view of the film drive mechanism shown in FIG. 19;

DETAILED DESCRIPTION OF THE EMBODIMENT

Figure 1:
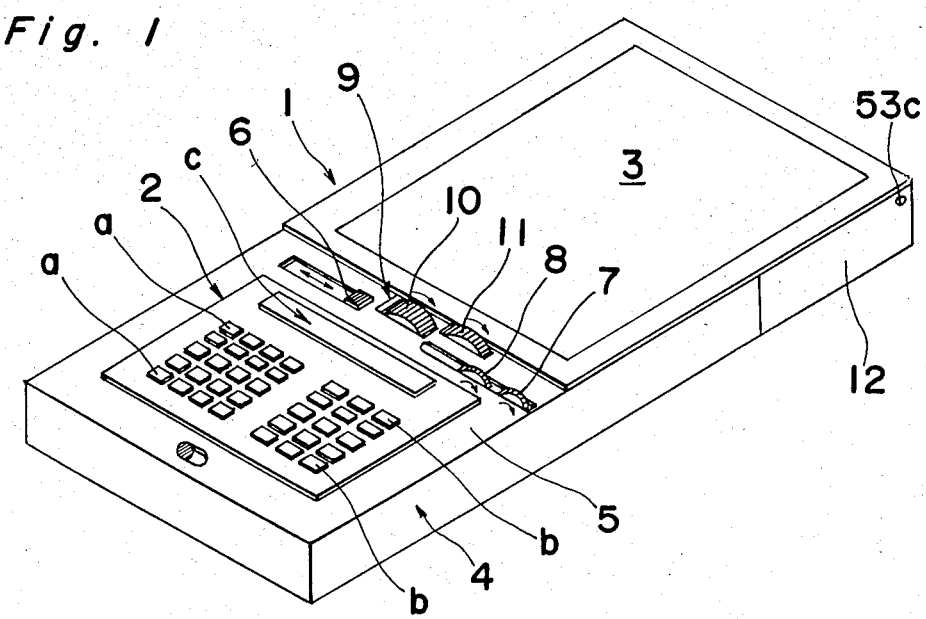
FIG. 1 is a perspective view of a micro-reader according to the present invention.

Before the description of the present invention proceeds, it is to be noted that like parts are designated by like reference numerals throughout the accompanying drawings.

Figure 2:
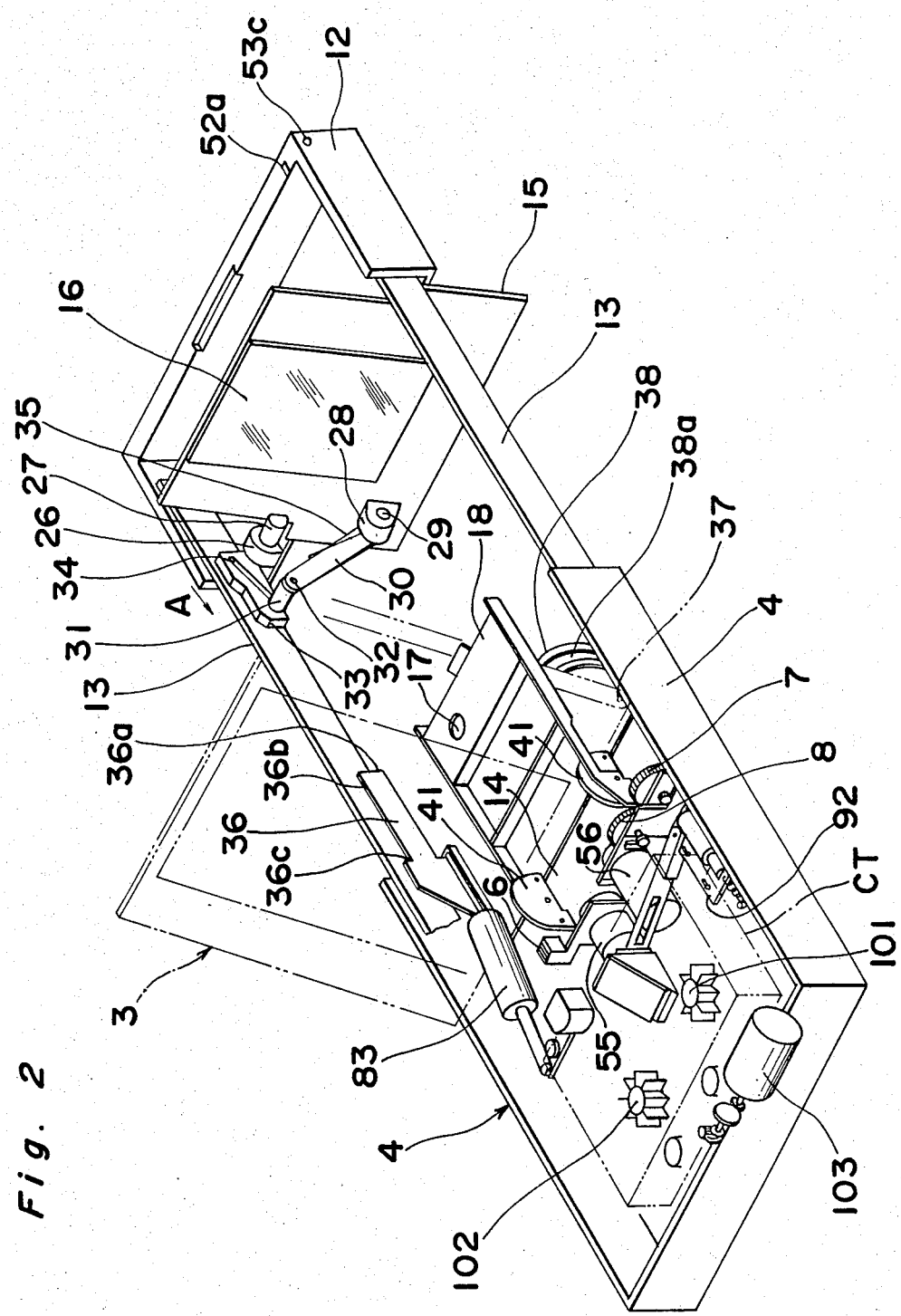
FIG. 2 is a perspective view, on an enlarged scale, of the micro-reader when in use, with a cassette cover removed.

As shown in FIG. 1, a micro-reader embodying the present invention is generally identified by 1 and is, when not in use, folded into a generally rectangular flattened box-like configuration with its top area covered by both a cassette cover 2 and a viewing screen 3, the cassette cover 2 being used to selectively open and close a cassette chamber for accommodating a microfilm cassette CT shown by the phantom line in FIG. 2.

The cassette cover 2 is, in the case where a retrievable microfilm is used, formed as a keyboard including a plurality of data input keys a for the entry of respective data for the retrieval, a plurality of function keys b comprised of a "Rewind" key, an "Advance" key, selector keys for selecting retrieval modes, etc., and a display c for the display of the address of each frame of the microfilm and data for the retrieval.

That portion 5 of the top area of a casing 4 which exteriorly surrounds the cassette cover 2 is provided with a magnification selector knob 6, a horizontal or transverse scanning dial 7 and a vertical or heightwise scanning dial 8, all of which are partially projected to the outside for the access to an operator's hand finger. In addition, through a generally rectangular opening 9 defined on the top area portion 5 at a location adjacent the viewing screen 3, roulettes 10 and 11 partially project for the focus adjustment of a low magnification projecting lens assembly 55 and a high magnification projecting lens assembly 56, respectively, and can be manipulated one at a time.

Figure 4:
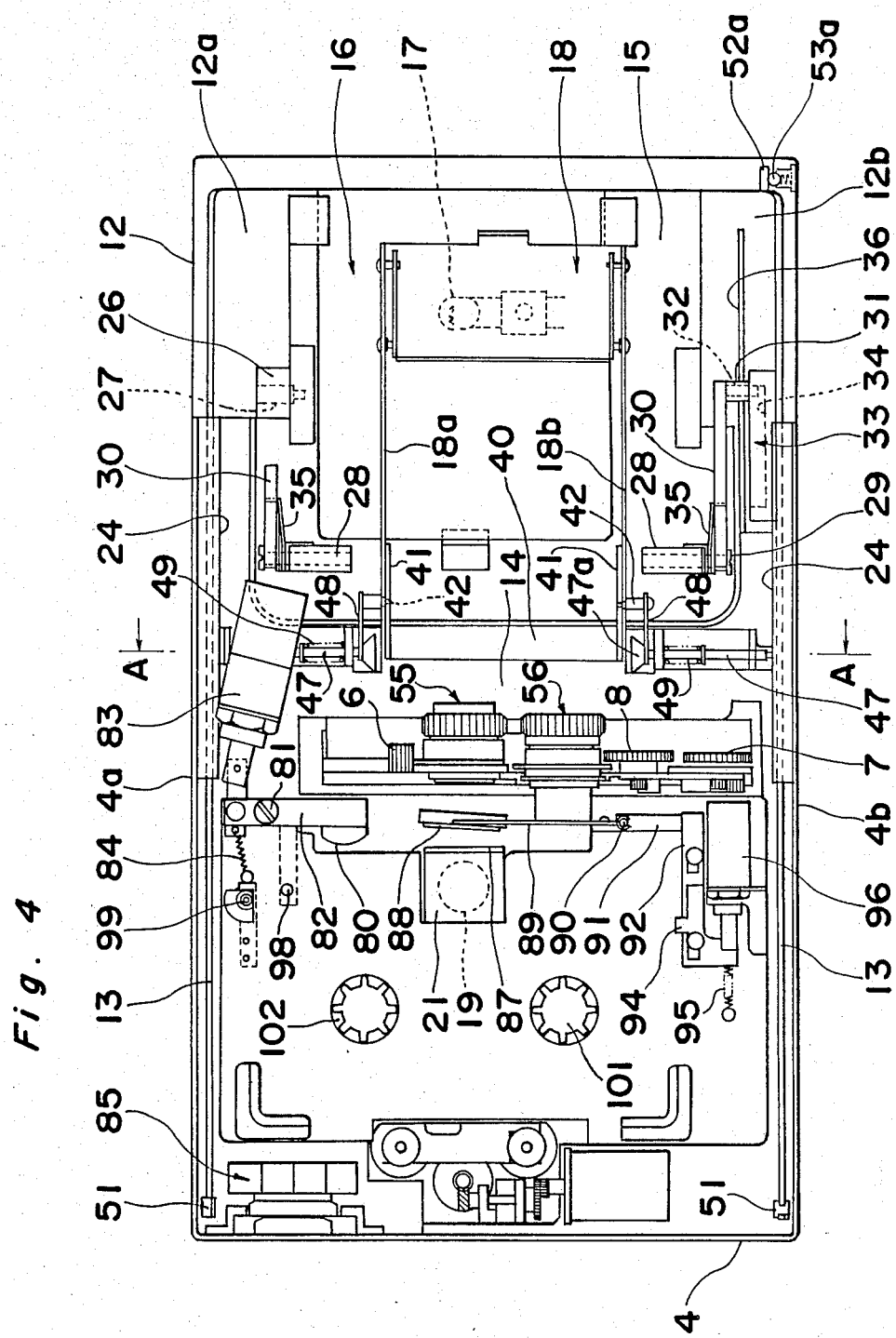
FIG. 4 is a top plan view of the micro-reader when not in use, with both the cassette cover and a screen removed.

FIG. 2 schematically illustrate the structure of the micro-reader 1 during the use thereof. In this condition, a movable member such as a generally U-shaped slide frame 12 is pulled outwards in a direction lengthwise of the casing 4, guided along a pair of spaced slide rails 13. The slide rails 13, secured at one end to the slide frame 12, are, as best shown in FIG. 4, telescopically movably guided by respective rail guides 24 fixed interiorly to associated side walls 4a and 4b of the casing 4. In this construction, when the slide frame 12 in pulled a predetermined distance outwards, a mirror support plate 15 which has been held in position to form a part of the bottom of the casing 4 while covering a bottom opening defined between a bottom wall 14 and the slide frame 12 can be erected so as to form a support leg for the support of the integer. At the same time, a reflecting mirror 16 supported by the mirror support plate 15 is held in position to reflect the incoming imagewise light, i.e., light penetrating from the opposite side of film to be formed an image of the penetrated light on a space, towards the viewing screen 3 then raised so as to assume a predetermined tilt angle relative to the casing 4.

The optical system employed in the micro-reader 1 according to the present invention will now be described with particular reference to FIG. 3.

Figure 3:
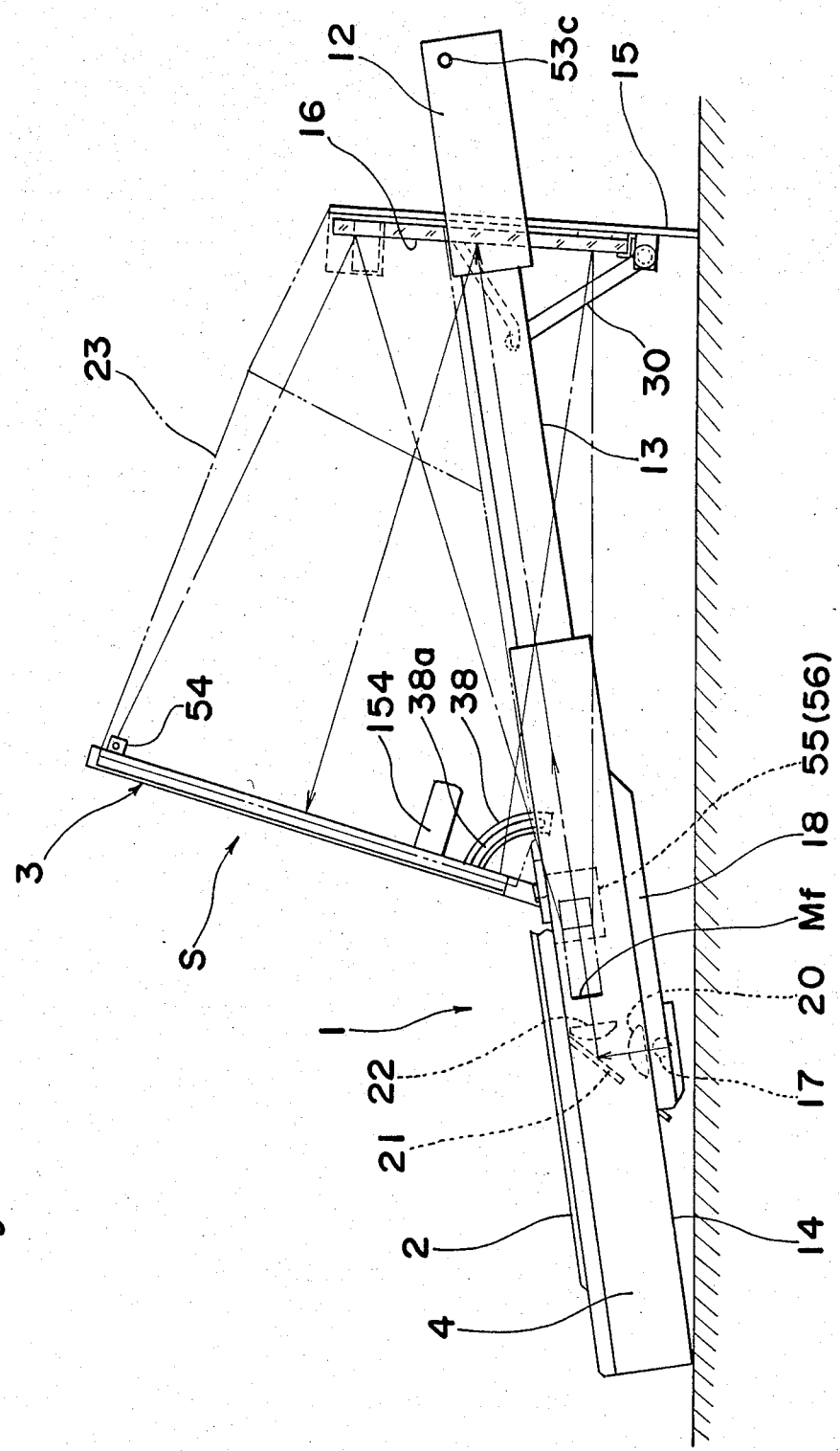
FIG. 3 is a side elevational view of the micro-reader shown in FIG. 2.

As shown in FIG. 3, a lamp holder 18 for the support of a lamp 17 forming a light source is attached exteriorly to and retained by the bottom wall 14 of the casing 4 so that rays of light emanating from the lamp 17 can be collected by a first condenser lens 20, mounted on the bottom wall 14 so as to cover a light hole 19 (FIG. 4) defined in the bottom wall 14 in alignment with the lamp 17, and then directed towards a microfilm Mf after having been deflected 90° by a deflecting mirror 21 and then collimated by a second condenser lens 22. As the collimated rays of light pass through the microfilm Mf, an image on the microfilm Mf is carried thereby and is then passed through either the low magnification projecting lens assembly 55 or the high magnification projecting lens assembly 56. The imagewise light emerging from the lens assembly 55 or 56 is, after having been reflected by the reflecting mirror 16, projected onto the screen 3 from rear, forming the image originally born by the microfilm Mf. The image of the microfilm Mf so projected onto the screen 3 from rear can be viewed from front in a direction as shown by S. It is to be noted that the space between the reflective mirror 16 and the screen 3 may be enclosed by an external light shield, not shown in FIG. 3, to avoid an interference between the imagewise light and the external light so as to increase the contrast of the image reproduced on the screen 3. This light shield is generally identified by 23 in FIGS. 23 to 27 and will be described in detail later although it is not always essential in the practice of the present invention.

The screen 3 is pivotally mounted on the top of the casing 4 by means of coaxial stud shafts 37, carried thereby, for angular movement between raised and folded positions through a predetermined angular distance determined by the actual length of an arcuate guide slot 38a formed in a guide plate 38. This screen 3 when in the folded position during the non-use of the micro-reader 1 forms a part of the top area of the casing 4.

Figure 11:
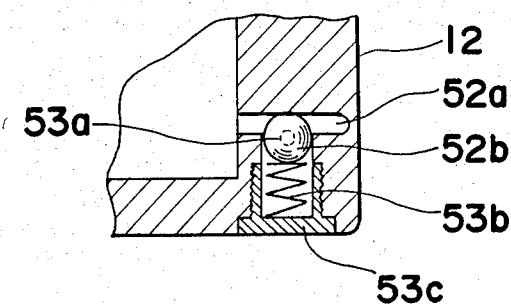
FIG. 11 is a fragmentary top sectional view of a corner area of the slide frame used in the micro-reader, showing a detent mechanism.
Figure 12:
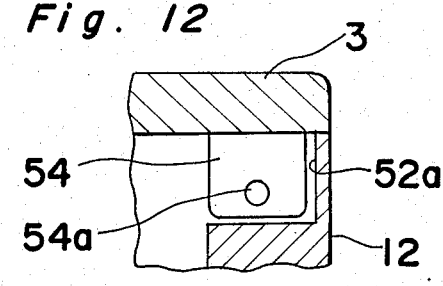
FIG. 12 is a side sectional view of the corner area of the slide frame shown in FIG. 11.

The illustrated micro-reader 1 utilizes a lock device for locking the slide frame 12 in a retracted position when the micro-reader 1 is not in use and, at the same time, for locking the screen 3 in the folded position. This lock device is shown in FIG. 11 and is in the form of a detent mechanism comprising a spring-loaded detent ball 53a and a biasing spring 53b accommodated in an internally threaded recess 52b defined in a corner of the slide frame 12 so as to extend in a direction widthwise of the casing 4 and is closed by an externally threaded plug 53c. The detent ball 53a, also accommodated within the recess 52b and biased by the biasing spring 53b, projects partially into a groove 52a defined in a bridge portion of the slide frame 12 so as to open upwards and inwardly of the casing 4 so that, when the screen 3 is pivoted about the stud shafts 37 to folded position while the slide frame 12 has been pushed inwardly to the retracted position as shown in FIG. 4, a lug member 54 rigidly secured to the screen 3 so as to extend in a direction generally perpendicular to the screen 3 and having a detent hole 54a defined therein as shown in FIG. 12 can be inserted into the groove 52a with the spring-loaded detent ball 53a consequently engaged in the detent hole 54a to lock the screen 3 at the folded position and, at the same time, to lock the slide frame 12 in the retracted position. With the lock device so constructed as hereinabove described, it will readily be seen that, as the screen 3 is pivoted towards the folded position when and after the slide frame 12 has been moved to the retracted position, the lug member 54 fast with the screen 3 is inserted into the groove 52a from above, urging the detent ball 53a against the biasing spring 53b and, upon the arrival of the screen 3 at the folded position, the detent ball 53a is immediately engaged into the detent hole 54a in the lug member 54 by the action of the biasing spring 53b to lock the screen 3 and the slide frame 12 in the folded and retracted positions, respectively, at the same time.

When the screen 3 is, however, pivoted to the folded position with the slide frame is pulled outwards to an extended position as shown in FIGS. 2 and 3, i.e., while the slide frame 12 has not yet been moved to the retracted position, the lug member 54 fast with the screen 3 will not be received in the groove 52a. However, the subsequent push of the slide frame 12 relative to the casing 4 to move the former to the retracted position results in the insertion of the lug member 54 fast with the screen 3, then held in the folded position, into the groove 52a from lateral direction with the detent ball 53a consequently engaged in the detent hole 54a to lock the screen 3 and the side frame 12 in the folded and retracted positions, respectively.

The external light shield enclosing the space between the screen 3 in the raised position and the reflective mirror 16 is preferably of a type which, when the screen 3 is pivoted to the raised position, can be expanded from a folded condition to cover the space between the screen 3 and the mirror 16 to avoid the intrusion of external light which would diminish the contrast of the image being projected onto the screen 3. However, the light shield may be made as a separate member from, and may be provided as an accessory to, the micro-reader 1 and, in such case, the light shield normally in the folded condition may be affixed to the micro-reader 1 and expanded manually.

The light shield 23 shown in and described with reference to FIGS. 23 to 27 is substantially of a two-component type comprising a front hood assembly 141 fitted to the back of the screen 3 in a manner as will be described later so as to cover two-thirds of the space between the screen 3 and the mirror 16, and a rear hood assembly 145 hinged to the front hood assembly 141 in a manner as will be described later so as to cover the rest of the space between the screen 3 and the mirror 16, it being to be noted that the terms "front" and "rear" hereinabove and hereinafter used are in relation to the direction in which the imagewise light reflected by the mirror 16 is projected onto the screen 3.

Figure 24:
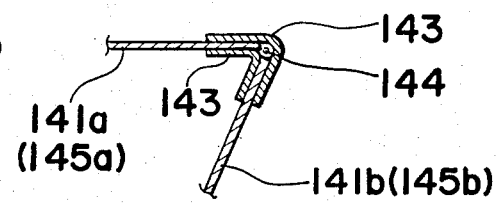
FIG. 24 is a schematic side sectional view of a portion of the light shield showing a hinged joint.

The front hood assembly 141 comprises a front top panel 141a for covering the top of the space between the screen 3 and the mirror 16 and a pair of laterally spaced front side panels 141b for covering the opposite sides of the space between the screen 3 and the mirror 6. The top panel 141a is hingedly connected at its front edge to an upper edge of the screen 3 by means of a hinge shaft 142, whereas the side panels 141b are hingedly connected at their upper edge to the opposite side edges of the top panel 141a by means of respective pairs of inner and outer lengths of flexible tapes 143 as best shown in FIG. 24. Accordingly, it is clear that the side panels 141b can be folded inwardly with respect to each other until they can be held substantially flat against the top panel 141a whereas the top panel 141a can be pivoted close to the screen 3 with the folded side panels 141b held in position between it and the screen 3.

Figure 27:
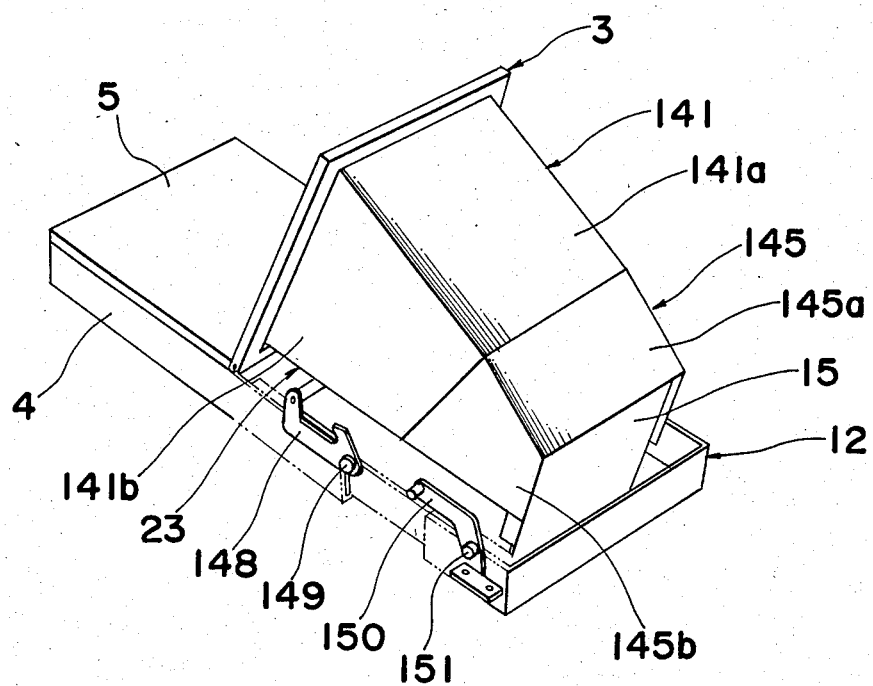

The side panels 141b then folded substantially flat against the top panel 141a can be automatically unfolded outwardly with respect to each other to a position where each of them lies in a plane generally perpendicular to the top panel 141a as shown in FIG. 27. For this purpose, a wire spring 144 having its opposite ends bent at right angles to a substantially intermediate portion thereof and lying in respective planes generally perpendicular to each other is interposed between the top panel 141a and each of the side panels 141b and 141c with the opposite ends secured to the panels 141a and 141b, respectively, while the substantially intermediate portion of the wire spring 144 loosely extends in a gap defined by the edges of the respective panels 141a and 141b, and the outer and inner lengths of flexible tapes 143. Since the substantially intermediate portion of each wire spring 144 can be twisted about its longitudinal axis, as the associated side panel 141b is pivoted in a direction towards the top panel 141a, while accumulating a biasing force necessary to pivot the associated side panel 141b away from the top panel 141a, the side panels 141b then folded can automatically be unfolded by the action of the respective wire springs 144 when the top panel 141a is pivoted in a direction away from the screen 3.

Figure 25:
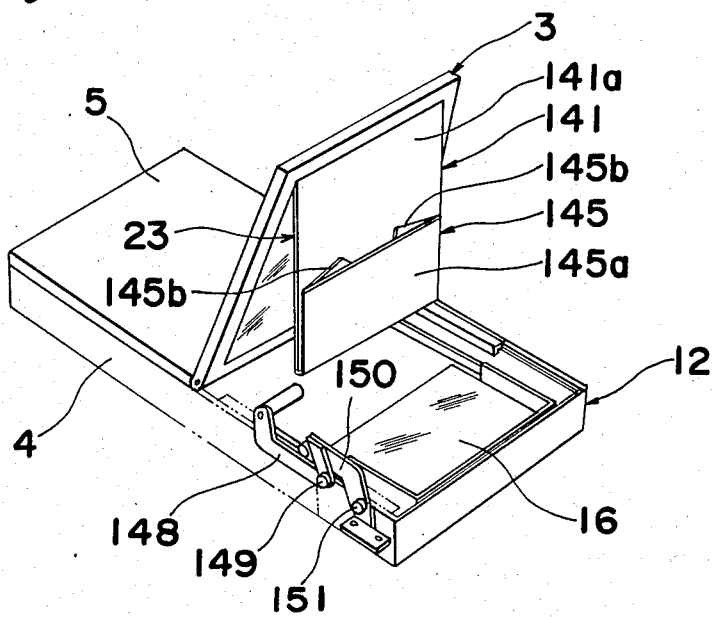
FIGS. 25 to 27 are perspective views of the micro-reader, showing the sequence in which the light shield is stretched to enclose the space between the screen and the reflective mirror.
Figure 26:
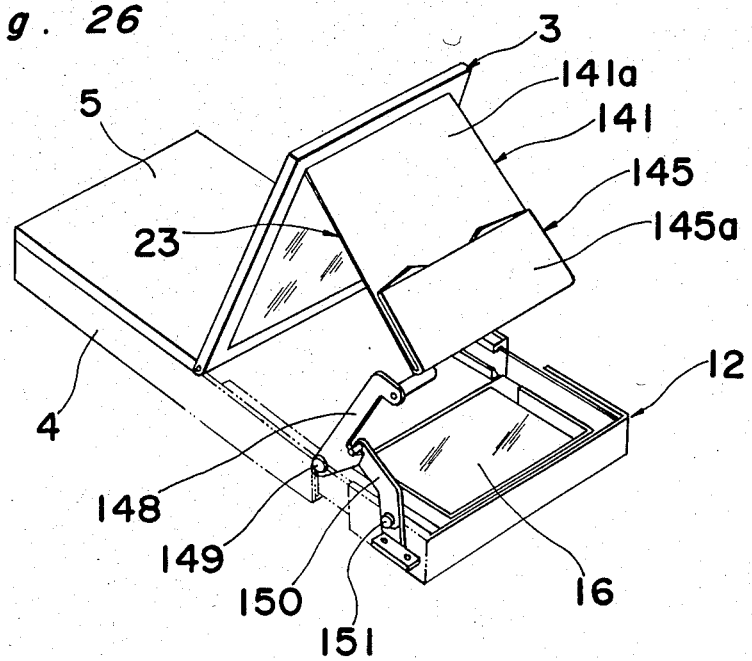

In order for the front hood assembly 141 to be expanded automatically, an erecting lever 148, FIG. 25, is pivotally secured to one side of the casing 4 by means of a pivot pin 149 on the one hand, and a trigger lever 150 engageable with the erecting lever 148 to cause the latter to be pivoted so as to pivot the top panel 141a in the direction away from the screen 3 as shown in FIG. 26 during the pull of the slide frame 12 to bring the latter to the extended position is pivotally mounted on one side of the slide frame 12 by means of a pivot pin 151. However, since the light shield 23 constructed according to the present invention can be unfolded manually, the use of the levers 148 and 150 and their associated parts is not be always essential.

In any event, the screen 3 may have a pair of spaced stoppers 154 (FIG. 3) secured to the opposite sides thereof for defining the unfolded positions for the side panels 141b.

The rear hood assembly 145 comprises a rear top panel 145a for covering the top of the space between the screen 3 and the mirror 6 and having its front edge hingedly connected to the rear edge of the front top panel 141a by means of a length of flexible tape 146, and a pair of spaced rear side panels 145b hingedly connected at their upper edge to the opposite side edges of the rear top panel 145a by means of respective lengths of flexible tapes 147. This rear hood assembly 145 is so designed that the side panels 145b can be folded so as to overlay the top panel 145a in a direction counter to the direction in which the side panels 141b and 141c of the front hood assembly 141 can be folded, whereas the top panel 145a with the side panels 145b folded can be pivoted in such a direction as to permit the rear top panel 145a, when folded, to be located on one side of the front top panel 141a opposite to the screen 3, substantially as shown in FIG. 25.

Figure 23:
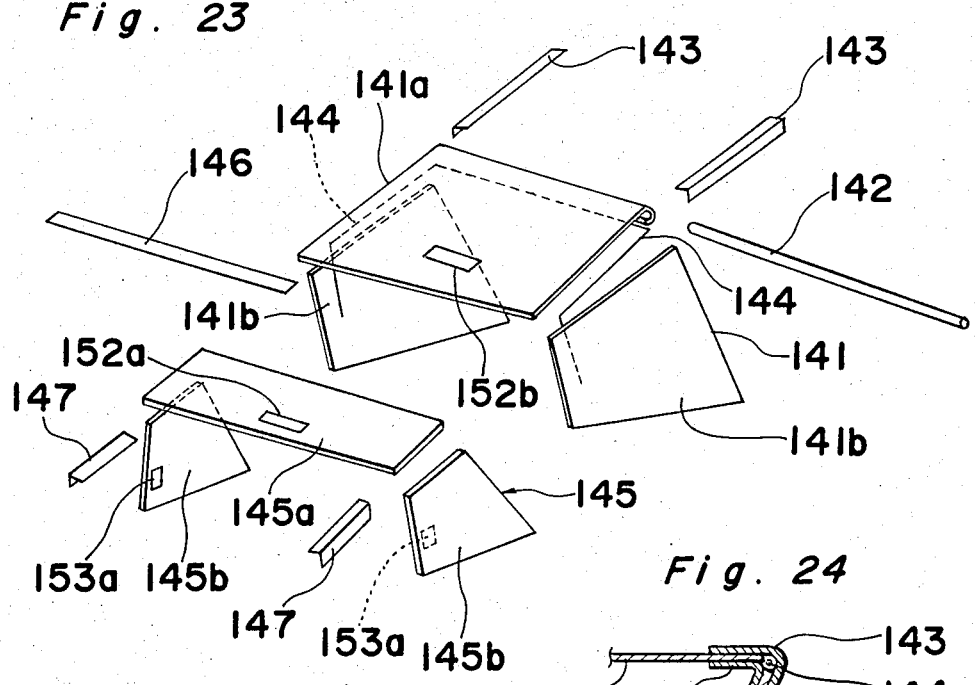
FIG. 23 is an exploded view of a light shield which may be employed in the micro-reader according to the present invention.

The front and rear top panels 141a and 145a may be provided respectively with a sheet-like magnet piece 152b and a magnetizeable piece 152a, as best shown in FIG. 23, so that when the rear top panel 145a is folded in the manner as hereinbefore described with the folded side panels 145b positioned between it and the front top panel 141a, it can be firmly retained in the folded position by the effect of the magnetic attraction between the magnet piece 152b and the magnetizeable piece 152a. Similarly, the rear side panels 145b may be provided with respective magnetizeable pieces 153a which can cooperate with respective sheet-like magnet pieces (not shown) secured to the mirror support plate 15 at the opposite sides thereof so that the rear side panels 145b when unfolded so as to lie in respective planes generally perpendicular to the rear top panel 145a can be retained firmly in the unfolded condition as shown in FIG. 27.

With the light shield 23 so constructed as hereinabove described, it will readily be seen that the light shield 23 which has been folded and accommodated within the casing 4 can be exposed to the outside when and after the screen 3 has been erected as shown in FIG. 25. The subsequent pull of the slide frame 12 to bring the latter to the extended position causes the trigger lever 150 to pivot the erecting lever 148 to pivot the front top panel 141a in the direction away from the screen 3, permitting the front side panels 141b to be instantaneously unfolded by the action of the respective wire springs 144. In this way, the front hood assembly 141 can be automatically expanded.

Thereafter, the rear top panel 145a overlaying the front top panel 145a as shown in FIG. 26 is pivoted rearwardly in a direction away from the front top panel 141a and the side panels 145b are then unfolded until the magnetizeable pieces 153a secured thereto are magnetically attracted by the associated magnet pieces (not shown) secured to the mirror support plate 15, wherefore the rear hood assembly 145 is expanded. In this way, the light shield 23 comprising the front and rear hood assemblies 141 and 145 can be completely expanded to enclose the space between the screen 3 and the mirror 16 thereby to shield it from the external light.

The light shield 23 once expanded as hereinbefore described can be folded down by following the procedure substantially reverse to that described above, i.e., by folding the rear side panels 145b so as to overlay the rear top panel 145a, then pivoting the rear top panel 145b in a direction close towards the front top panel 141a with the folded rear side panels 145b positioned between the front and rear top panels 141a and 145a, folding the front side panels 141b inwardly with respect to each other so as to bring them to one side of the front top panel 141a opposite to the rear top panel 145a against the respective wire springs 144, and finally pivoting the assembly in a direction close towards the screen 3. When the light shield 23 is so folded down, it substantially lies in a plane parallel to the screen 3. This folded light shield 23 can be accommodated within the casing 4 when the screen 3 is pivoted to the folded position with the slide frame 12 moved to the retracted position.

The details of the micro-reader 1 of the structure schematically described hereinbefore will now be described under separate headings as set forth below.

Figure 5:
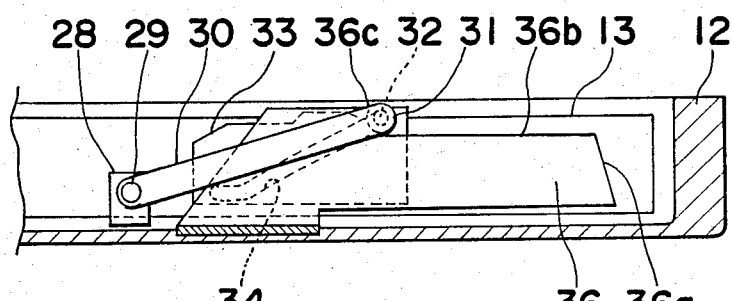
FIG. 5 is a side sectional view of a portion of the micro-reader, showing the details of a mirror erecting mechanism.

(A) Reflector Erecting Mechanism:

A mechanism for automatically erecting when the slide frame 12 has been pulled outwards to a predetermined position will first be described with reference to FIGS. 2, 4 and 5.

The opposite sides of the mirror support plate 15 are supported at an intermediate portion thereof by respective hinge pins 27 for pivotal movement between upright and laid-down positions about a common axis extending between the hinge pins 27, said hinge pins 27 being in turn supported by respective brackets 26 which are rigidly mounted on respective spaced bottom wall segments 12 and 12b adjacent the opposite sides of the slide frame 12. One of the opposite edges of the support plate 15, which will constitute a lower edge thereof when the support plate 15 is held in the upright position as shown in FIG. 2, is provided with a hinge bracket 28 to which one end of an actuating lever 30 is hingedly connected through a hinge pin 29. The other end of the actuating lever 30 has a support spindle 32 rigidly mounted thereon so as to extend in a direction perpendicular thereto and towards one of the slide rails 13, which support spindle 32 has a roller 31 rotatably mounted thereon. The support spindle 32 extending from the actuating lever 30 and then through the roller 31 terminates in and is slidably inserted into a guide groove 34 defined in a guide block 33 which is rigidly secured to the slide rail 13 adjacent the joint between such slide rail 13 and the slide frame 12. The guide groove 34 is so inclined relative to the direction of movement of the slide frame 12 as to extend downwards in a direction from the slide frame 12 towards the casing 4 such that, as the support spindle 32 for the roller 31 is moved in a direction indicated by A in FIG. 2 by the guidance of the guide groove 34, the support plate 15 can be pivoted by the actuating lever 30 about the hinge pins 27 so as to move the plate 15 from folded position towards the upright position. It is to be noted that a torsion spring 35 is mounted on the hinge pin 29 with its opposite ends engaged respectively to the plate 15 and the actuating lever 30 for biasing the actuating lever 30 in a direction necessary to move the support plate 15 from the laid-down position towards the upright position.

As best shown in FIG. 2, the roller 31 carried by the actuating lever 30 cooperates with a stepped cam plate 36 provided for causing the support plate 15 to move from the upright position to the laid-down position when the slide frame 12 is pushed towards the retracted position. This stepped cam plate 36 is of a generally elongated configuration having one end 36a extending in parallel to the adjacent slide rail 13 and adapted to contact the roller 31 to relatively push the latter. The stepped cam plate 36 also has an upper edge 36b formed with a raised stopper 36c located adjacent the casing 4 and remote from the abutment end 36a. This stepped cam plate 36 is so designed that, as the slide frame 12 is pushed from the extended position, as shown in FIG. 2, towards the retracted position as shown in FIG. 4, the abutment end 36a of the stepped cam plate 36 contacts the roller 31 on the support spindle 32 to cause the latter to slide along the guide groove 34 upwardly towards the slide frame 12 with the mirror support plate 15 consequently pivoted from the upright position towards the laid-down position. It is to be noted that, when the support spindle 31 is brought to an upper end of the guide groove 34, pushed by the abutment end 36a of the stepped cam plate 36 in contact with the roller 31, the roller 31 starts riding on the upper edge 36b of the stepped cam plate 36 to allow the latter to pass relatively underneath the roller 31 until the roller 31 is brought into abutment with the raised stoppers 36c on the upper edge 36b of the cam plate 36. At the time the roller 31 starts riding on the upper edge 36b as hereinabove described, the mirror support plate 15 is completely pivoted to the laid-down position, and upon the arrival of the slide frame 12 at the retracted position, not only is the roller 31 brought into abutment with the raised stopper 36c, but also the mirror support plate 15 in the laid-down position is flush with and functions as a continuation of the bottom wall 14 (FIG. 3) of the casing 4 thereby forming a part of the bottom wall of the micro-reader 1, as shown in FIG. 7.

On the other hand, when the slide frame 12 in the retracted position is pulled outwards towards the extended position, and when the roller 31 riding on the upper edge 36b of the cam plate 36 subsequently leaves away from the abutment and 36a of the cam plate 36 as a result of the continued movement of the slide frame 12 towards the extended position, the support spindle 32 for the roller 31 is brought into a condition free to move downwards along the guide groove 34 in the direction A under the influence of the biasing force exerted by the torsion spring 35 while permitting the mirror support plate 15 to pivot from the laid-down position towards the upright position, the angle to which the support plate 15 is erected being determined by the position of a lower end of the guide groove 34.

From the foregoing, it has now become clear that the support plate 15 supporting the reflecting mirror 16 can be automatically pivoted between the laid-down position and the upright position in response to the movement of the slide frame 12 between the retracted position and the extended position. The reflecting mirror 16 with the support plate 15 held in the upright position is in position to reflect the imagewise light, which has been projected through either the low magnification projecting lens assembly 55 or the high magnification projecting lens assembly 56, towards the screen 3 then held in the uprisen position as shown by the phantom line in FIG. 2.

The screen 3 has been described as pivotally mounted on the casing 4 by means of the stud shafts 37 while the pivotal movement of the screen 3 between the folded position and the raised position is guided by the arcuate guide slot 38a in the guide plate 38 as shown in FIG. 3. However, a similar raised mechanism for pivotally moving the screen 3 between the folded and raised positions in response to the movement of the slide frame 12 between the retracted and extended positions may be employed, such as that described with particular reference to FIG. 6.

Figure 6:
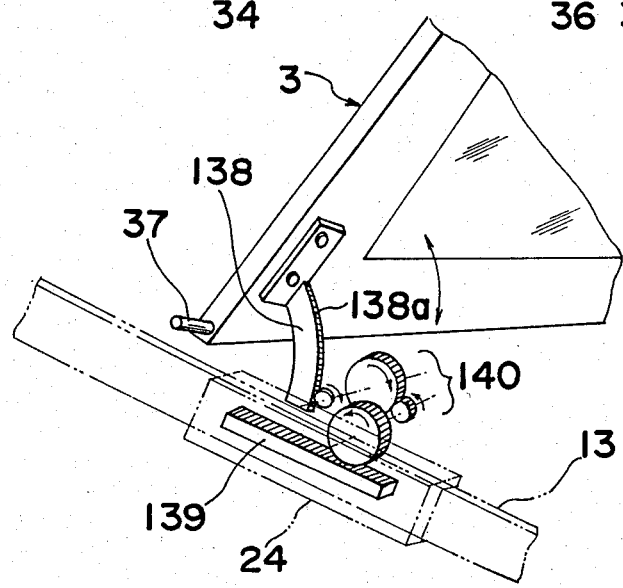
FIG. 6 is a schematic perspective view of a portion of the micro-reader, showing a modified form of screen uprising mechanism.

In the embodiment shown in FIG. 6, an arcuate rack member 138 curved so as to have the center of curvature lying in coaxial relation to the stud shaft 37 is rigidly secured to the screen 3 so as to angularly extend about the stud shaft 37. This arcuate rack member 138 has a geared ridge 138a operatively associated with a linear rack member 139, rigidly mounted on the slide rail 13 for movement together with the slide frame 12, through a train of gears 140 that the linear movement of the rack member 139 incident to the movement of the slide frame 12 between the retracted and extended positions results in the angular movement of the screen 3 between the folded and raised positions about a common axis coaxial with the stud shafts 37.

(B) Lamp Support:

In the embodiment shown and described, the lamp holder 18 for the support of the lamp 17 is, when and so long as the micro-reader 1 is not in use, accommodated in a space immediately above the mirror support plate 15 without interfering therewith as best shown in FIGS. 4 and 7, but when the slide frame 12 is pulled outward from the retracted position towards the extended position with the support plate 15 consequently pivoted to the upright position in the manner as hereinbefore described in readiness for the use of the micro-reader 1, the lamp holder 18 can come to an operative position immediately below the bottom wall 14 of the casing 4.

Referring to FIGS. 4, 7 and 8, the lamp holder 18 has a pair of spaced arms 18a and 18b extending outwards from the lamp holder 18 in parallel relation to each other in a direction confronting the casing 4. The free end of each of said arms 18a and 18b in provided with a generally triangular plate 18d or 18c integrally formed therewith and connected hingedly to a respective, generally semi-circular bracket 41 through a respective hinge pin 42. The generally semi-circular brackets 41, one for each arm 18a, 18b, are provided on a support plate 40 which is in turn is fixedly mounted on the bottom wall 14 of the casing 4 at a location adjacent the junction between the bottom wall 14 and the mirror support plate 15, the hinge pins 42 being positioned generally in alignment with the respective centers of curvature of the associated semi-circular brackets 41. Each of the semi-circular brackets 41 is formed with a pair of detent holes 43 and 44 on respective sides of the associated hinge pin 42 and spaced an equal distance from such associated hinge pin 42, the detent hole 43 defining the inoperative position for the lamp holder 18 whereas the detent hole 44 defines the operative position for the lamp holder 18.

On the other hand, each of the triangular plates 18c and 18d fast with the respective arms 18a and 18b carries a detent ball 46 fitted thereto by means of a respective leaf spring 45 and protruding partially to the side of the respective triangular plate 18c or 18d adjacent the associated semi-circular bracket 41. Thereafter, when and so long as the lamp holder 18 is in the inoperative position wherein, as shown in FIGS. 4 and 7, the lamp holder 18 is positioned immediately above the mirror support plate 15, the detent balls 46 carried respectively by the triangular plates 18c and 18d are engaged in the detent holes 43, but when the lamp holder 18 is pivoted about the hinge pins 42 to the operative position, the detent balls 46 are brought into engagement with the respective detent holes 44, having been moved 180° about the hinge pins 42 along the respective semi-circular brackets 41. The pivotal movement of the lamp holder 18 from the inoperative position towards the operative position is effected manually after the slide frame 12 has been pulled outwards to the extended position, and the lamp 17 in the lamp holder 18 can be brought into alignment with and immediately below the first condenser lens 20, mounted on the bottom wall 14 as shown in FIG. 7, when the lamp holder 18 is pivoted to the operative position.

It is to be noted that, in the event that the slide frame 12 in the extended position is moved towards the retracted position while the lamp holder 18 has not yet been moved to the inoperative position, that is, while the lamp holder 18 is still in the operative position with the arms 18a and 18b extending so as to traverse the plane in which the mirror support plate 15 moves together with the slide frame 12, one or both of the mirror support plate 15 and the reflecting mirror 16 supported thereby may be damaged. This possibility is, according to the present invention, taken into consideration and can be advantageously obviated by the provision of a safety mechanism which will now be described.

The safety mechanism referred to above comprises, as shown in FIGS. 4, 7 and 8, a pair of lock pins 47 supported for movement between locking and unlocking positions in a direction widthwise of the casing 4, and an operating lever 48 for each of the lock pins 47. Each of the lock pins 47 has one end adjacent the associated bracket 41 formed integrally with a generally conical cam member 47a having an cam face tapering towards the respective lock pin 47, and the associated operating lever 48 is so supported by the respective triangular plate 18c or 18d as to engage the cam face of the associated conical cam member 47a. The lock pins 47 are normally biased to the respective locking of positions by respective coil springs 49, in which condition the free ends of the lock pins 47 opposite to the associated conical cam members 47a are engaged in respective lock holes 50 defined in the slide rails 13 to lock the slide frame 12 in the extended position. However, the free ends of the lock pins 47 are held in sliding contact with the associated slide rails 13, without being engaged in the lock holes 50, when and so long as the slide frame 12 has not yet reached, or is not held in, the extended position.

The safety mechanism constructed as hereinabove described is so designed and so operable that, when the slide frame 12 is pulled outwards to the extended position in which condition stoppers 51 rigidly mounted on the free ends of the respective slide rails 13 opposite to the slide frame 12 about respective ends of the rail guides 24 adjacent the slide frame 12, the lock pins 47 are brought into alignment with the respective lock holes 50 in the slide rails 13 and that, when the lamp holder 18 is subsequently, i.e., after the slide frame 12 has been moved to the extended position, pivoted to the operative position with the detent balls 46 engaged in the detent holes 43, the operating levers 48, pivotable together with the lamp holder 18 because they are supported by the triangular plates 18c and 18d, separate from the associated conical cam members 47a fast with the respective lock pins 47 to allow the free ends of the lock pins 47 to be engaged in the lock holes 50 by the action of the coil springs 49. In view of this, it will readily be seen that unless the lamp holder 18 is returned to the inoperative position, the slide frame 12 is locked in the extended position and no one can push the slide frame 12 towards the retracted position. This is because the lock pins 47 with their free ends engaged in the lock holes 50, i.e., the lock pins 47 held in the locking positions, can be moved back to the unlocking positions against the coil springs 49 with the free ends thereof disengaging from the lock holes 50, only when the lamp holder 18 is pivoted back to the inoperative position with the operating levers 48 consequently displacing the associated lock pins 47 against the coil springs 49 in sliding contact with the respective conical cam faces of the cam members 47a.

(C) Optical System And Scanning Mechanism:

In order to make the micro-reader 1 handy and compact, the viewing screen 3 of a cabinet size was employed in a trial model of the micro-reader 1 embodying the present invention. It has been found that the image reproduced in a cabinet size on the screen from a single frame of the microfilm Mf often lacks detail. Therefore, the micro-reader herein disclosed is so designed that, although the image born in each frame of the microfilm Mf is generally reproduced, i.e., projected, onto the screen 3 in a cabinet size, a fraction of such image can also be projected onto the same screen in a cabinet size if desired to view the details of the image. In other words, in the micro-reader herein disclosed, the screen 3 is of a cabinet size and, however, either the image in its entirety or a portion of the image can be selectively projected onto the same screen to the full surface area. For this purpose, the micro-reader 1 is provided with a low magnification projecting lens assembly 55 for projecting the image of a given size on the full surface area of the screen 3 and a high magnification projecting lens assembly 56 for projecting an approximately quarter of the image of the same given size onto the full surface area of the same screen 3, as will now be described with particular reference to FIGS. 4, 9, 10 and 13 to 16.

Figure 13:
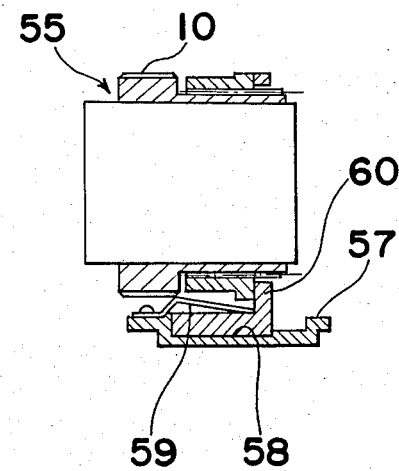
FIGS. 13 and 14 are cross-sectional views taken along the lines D—D and B—B in FIG. 10, respectively.

As best shown in FIG. 13, the first lens assembly 55 used for projecting the entire surface area of each frame of the microfilm Mf onto the screen 3 at a relatively low magnification is supported by a first support frame 60 slidingly received in a transverse guide groove 58 defined in an elongated support base 57 extending widthwise of the casing 4. The first support frame 60 is held in position as received in said guide groove 58 by means of a leaf spring 59 acting to urge, from above, the frame 60 against the support base 57. The focusing of the lens assembly 55 can be accomplished by rotating the roulette 10 to cause a lens barrel to screw in a direction parallel to the optical axis of the lens assembly 55. The magnification selector knob 6 previously described with reference to FIG. 1 is mounted on the top of the first support frame 60.

At the rear face of the first support frame 60, as viewed in the direction towards the reflecting mirror 16, a second support frame 61 is mounted on the first support frame 60 for sliding movement in a direction widthwise of the casing 4. The second support frame 61 has defined therein a pair of spaced guide slots 62 and 62', FIG. 10, through which respective guide pins 63 and 63' loosely extend, so that the second support frame 61 can be guided widthwise of the casing 4 over a distance defined by the length of each of the guide slots 62 and 62'. It is to be noted that the guide slots 62 and 62' are defined in the second support frame 61 at different heights above the support base 57 and that, as best shown in FIG. 14, the second support frame 61 is tightly pressed against, and hence, retained by, the rear face of the first support frame 60 by the action of coil springs 64 mounted respectively around the guide pins 63 and 63'.

Figures 9, 10:
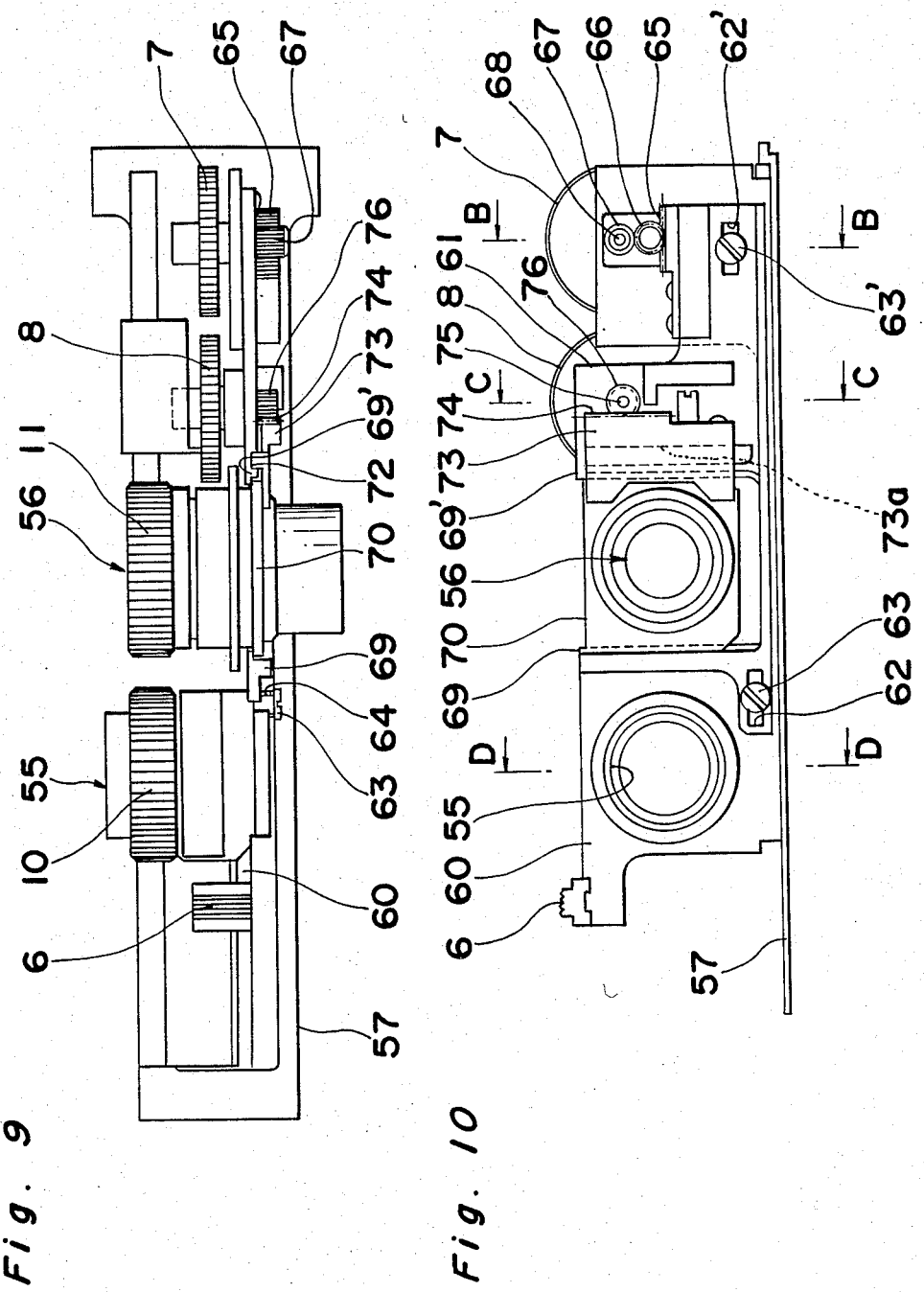
FIG. 9 is a top plan view, on enlarged scale, of a lens support used in the micro-reader.
FIG. 10 is a front elevational view of the lens support shown in FIG. 9.
Figure 14:
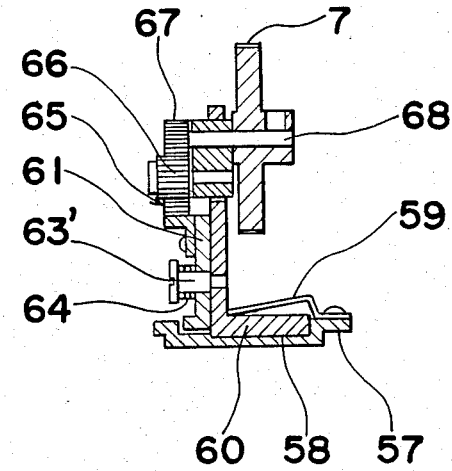

At a right-hand end of the second support frame 61 as viewed in FIG. 10, the second support frame 61 is provided with a rack gear 65 extending widthwise of the casing and constantly meshed with a pinion gear 66 which is rotatably supported by the first support frame 60 and is meshed with a gear 67 positioned thereabove as shown in FIGS. 9, 10 and 14. The gear 67, operatively coupled with the rack gear 65 through the pinion gear 66 in the manner as described above, is mounted on a rotary shaft 68, rotatably supported by the first support frame 60, and adapted to be driven by the transverse scanning dial 7 also mounted on the rotary shaft 68 for rotation together therewith. Thus, it will readily be seen that, when the transverse scanning dial 7 is manually rotated, the rack-and-pinion mechanism comprising the rack gear 65 and the gears 66 and 67 causes the second support frame 61 to displace relative to the first support frame 60 in one of the opposite directions widthwise of the casing 4.

Figure 15:
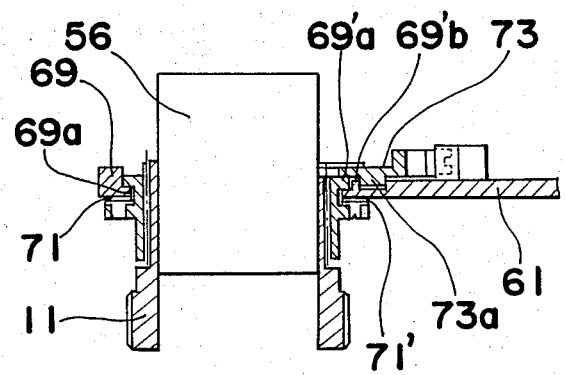
FIG. 15 is a view similar to FIG. 13, showing the manner by which another lens assembly is supported.

Referring particularly to FIGS. 9, 10 and 15, the second lens assembly 56 used for projecting a portion of each frame of the microfilm Mf onto the screen 3 at a relatively high magnification is supported in side-by-side relation to the first lens assembly 55 by a third support frame 70 which is in turn supported by a pair of spaced upright guide posts 69 and 69' for sliding movement in a direction perpendicular to the longitudinal sense of the support base 57. The focusing of the second lens assembly 56 can be accomplished by rotating the roulette 11 provided therein. As best shown in FIG. 15, the third support frame 70 sandwiches respective rail portions 69a and 69'a of the guide posts 69 and 69' and is slidingly guided along the guide posts 69 and 69' without being rattled in the axial direction because of respective leaf springs 71 and 71' which are inserted between the second and third support frames 61 and 70 so as to extend along the adjacent guide posts 69 and 69'.

Figure 16:
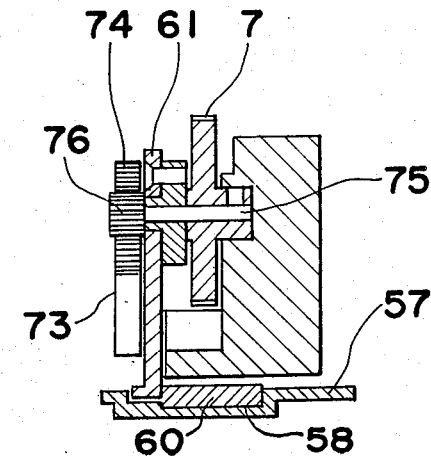
FIG. 16 is a cross-sectional view taken along the line C—C in FIG. 10.

As best shown in FIG. 9, the right-hand guide post 69' is provided with another rail portion 69'b, FIG. 15, protruding in a direction opposite to the direction towards the reflective mirror 16 in parallel relation to the optical axis of the second lens assembly 56. A guide plate 73 having formed therein an elongated engagement 73a slidingly received in a guide groove 72, defined adjacent to and along the rail portion 69'b so as to extend in a direction perpendicular to the support base 57, has its right-hand side edge provided with a rack gear 74 extending in a direction perpendicular to the support base 57. On the other hand, the opposite, left-hand side edge of the guide plate 73 is fixed to the third support frame 70, while the rack gear 74 is meshed with a pinion gear 76 rigidly mounted on a shaft 75, rotatably supported by the second support frame 61 as shown in FIGS. 10 and 16, said shaft 75 having the vertical scanning dial 8 rigidly mounted thereon so that, when the vertical scanning dial 8 is manually rotated, the third support frame 70 carrying the second lens assembly 56 can be slid in a vertical direction perpendicular to the support base 57 relative to the second support frame 61 whereby each frame of the microfilm Mf can be scanned vertically.

In the construction so far described, it is clear that, when the magnification selector knob 6 is manipulated, the first and second lens assemblies 55 and 56 can be selectively brought into operative position one at a time. It is also clear, that in the event that the second lens assembly 56 for the high magnification projection is selected, any one of the frames of the microfilm Mf can be scanned horizontally and vertically when the transverse scanning dial 7 is manipulated and when the vertical scanning dial 8 is manipulated, respectively. Specifically, in the latter case, when the dials 7 and 8 are alternately or simultaneously manipulated, a desired portion of the frame of the microfilm Mf can be brought in position ready to be projected on enlarged scale onto the screen 3.

(D) Read-out Head Arrangement:

Referring to FIG. 4, the micro-reader 1 embodying the present invention is provided with a read-out head 80 similar to that used in any known magnetic tape recording and/or reproducing apparatus. The read-out head 80 employed in the micro-reader 1 is utilized to read out information recorded on a length of magnetic tape forming a part of the retrievable microfilm Mf which will now be described with particular reference to FIG. 17.

Figure 17:
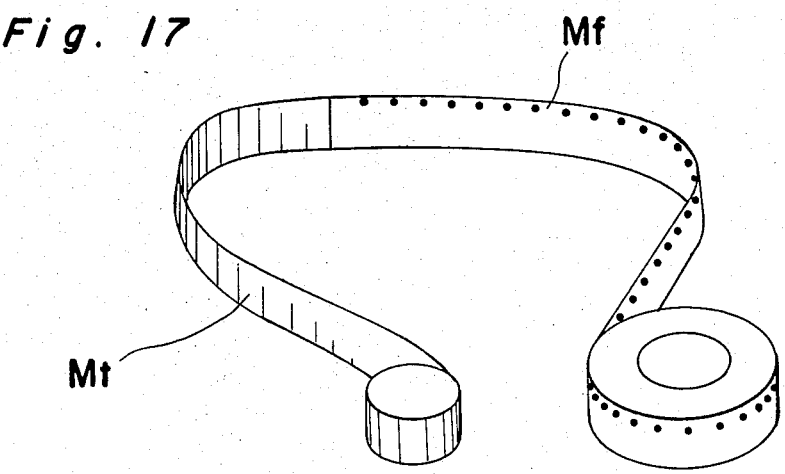
FIG. 17 is a schematic perspective view showing a microfilm used in the present invention.

The retrievable microfilm Mf hereinbefore and hereinafter used in connection with the present invention is the one comprising, as shown in FIG. 17, a strip of microfilm Mf having a plurality of film frames defined therein lengthwise thereof, and a length of magnetic tape Mt connected with one end of the strip of microfilm Mf and having recorded thereon pieces of information, such as, for example, date, classification codes and other data for retrieval, together with an address for each of the frames of the strip of microfilm Mf.

As shown in FIG. 4, the read-out head 80 is rigidly mounted on a rocker arm 82 pivotable about a support stud 81 in a plane parallel to the bottom wall 17 of the casing 4, one end of said rocker arm 82 remote from the read-out head 80 being operatively coupled with a first electromagnetic solenoid 83. This rocker arm 83 is normally biased by a coil spring 84 to keep the read-out head 80 at an inoperative position disengaged from the length of magnetic tape Mt. The timing at which the first electromagnetic solenoid 83 is energized will be described later because it is associated with such other mechanisms as will now be described. However, it is to be noted that data read-out by the read-out head 80 is adapted to be inputed to a one-chip microcomputer 85 built in the micro-reader 1.

Figure 18:
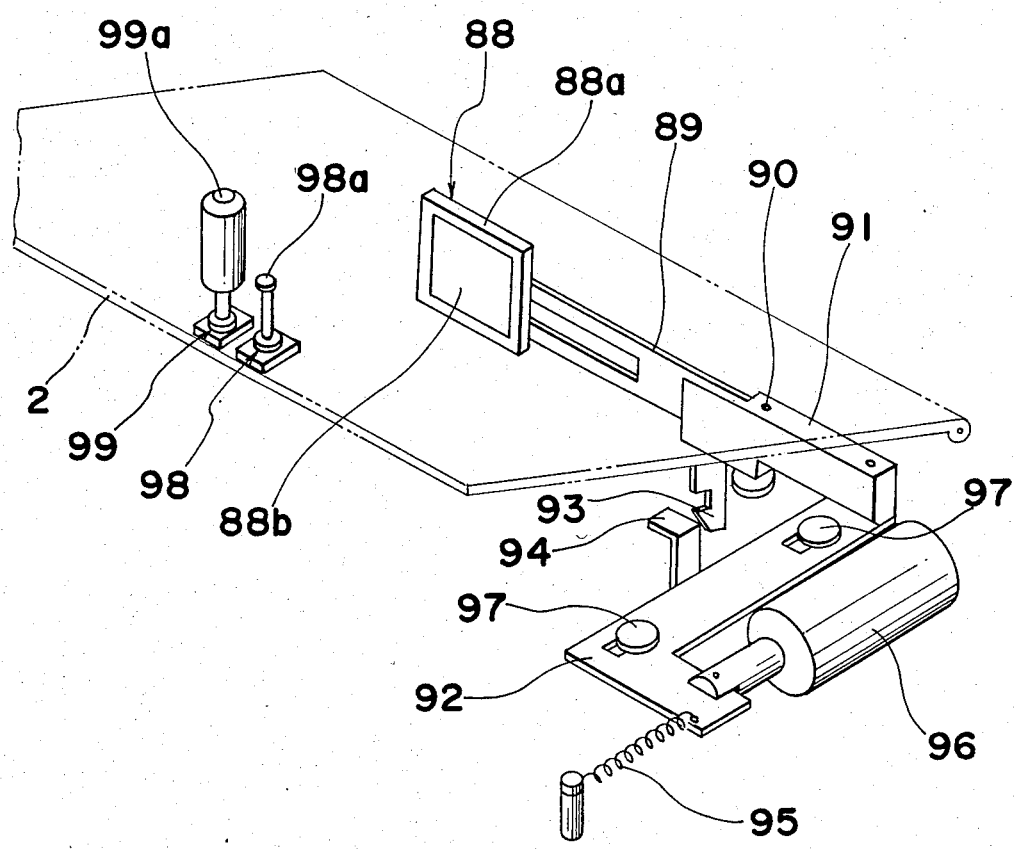
FIG. 18 is a schematic perspective view showing a film presser plate and a cover locking mechanism employed in the micro-reader.

(E) Presser Plate & Cassette Cover Lock:

A presser plate mechanism and a lock mechanism for locking the cassette cover 2 are best shown in FIGS. 4 and 18.

A presser plate 88 for pressing any one of the frames of the microfilm Mf in register with an aperture 87 in front of the second condenser lens 22, as shown in FIGS. 3, to keep the flatness of the film frame comprises, as best shown in FIG. 18, a generally rectangular frame 88a having a rectangular opening covered by a transparent plate 88b. This presser plate 88 is tiltably supported on a forked end of a leaf spring 89 which is in turn fixed to an actuating lever 91 mounted on a shaft 90 for pivotal movement about the shaft 90 in a horizontal plane parallel to the bottom wall 14 of the casing 4. One end of the actuating lever 91 remote from the leaf spring 89 is coupled to a locking lever 92 for locking the cassette cover 2.

The locking lever 92 is formed, or provided, with an engagement pawl 94 engageable with a hook member 93 secured to the cassette cover 2 so as to extend downwardly into the casing 4, and is normally biased by a coil spring 95 to a disengaged position at which the pawl 94 is disengaged from the hook member 93 as shown in FIG. 18. In opposition to the coil spring 95, there is provided a second electromagnetic solenoid 96 operable, when energized, to move the locking lever 92 from the disengaged position towards an engaged position against the coil spring 95, while the locking lever 92 is guided by a pair of spaced guide pins 97 loosely extending through respective guide slots in the locking lever 92. When the locking lever 92 is so moved to the engaged position, the pawl 94 integral therewith is engaged to the hook member 93 fast with the cassette cover 2 to lock the latter in a closed position. The second electromagnetic solenoid 96 can be energized simultaneously with the first electromagnetic solenoid 83 only when two limit switches 98 and 99 are simultaneously closed in a manner as will be described subsequently.

It is to be noted that the micro-reader according to the present invention can be utilized to the best advantage if the micro-film Mf contained in such a cassette as disclosed in the Japanese Laid-open Patent Publication No. 59-210429 (corresponding to the U.S. Patent Application Ser. No. 644,516, filed in 1984) is employed. However, the microfilm Mf utilizeable in the present invention is not always limited thereto.

As best shown in FIG. 18, the limit switch 98 has a sensor 98a of relatively small height and is adapted to be depressed, and therefore closed, by the bottom of the film cassette CT (FIG. 2) when the latter is loaded into the cassette chamber within the casing 4. Thus, this limit switch 98 is used for the detection of the presence of the film cassette CT within the cassette chamber in the casing 4. On the other hand, the limit switch 99 has a sensor 99a of relatively great height and is adapted to be closed in contact with the cassette cover 2 when the latter is completely closed, i.e., pivoted to the closed position, and therefore, this limit switch 99 is used for the detection of the closure of the cassette cover 2.

In view of the foregoing, the simultaneous closure of the limit switches 98 and 99 indicates that, while the film cassette CT has been correctly loaded, the cassette cover 2 has been completely closed. When the second electromagnetic solenoid 96 is energized in response to the simultaneous closure of the limit switches 98 and 99, the hook member 93 fast with the cassette cover 2 is engaged by the pawl 94 integral with the locking lever 92 in the manner as hereinbefore described, with the cassette cover 2 consequently locked in the closed position to avoid any inadvertent or accidental opening of the cassette cover 2 during the operation of the micro-reader 1. Simultaneously with the locking of the cassette cover 2 in the closed position, the actuating lever 91 coupled with the locking lever 92 is pivoted to bring the presser plate 88 in position to press the film frame. In addition, by the operation of the first electromagnetic solenoid 83, the read-out head 80 is brought into an operative position at which the head 80 can read out information from the magnetic tape Mt.

In the case of the microfilm to which the magnetic tape Mt is connected as shown in FIG. 17, by taking the simultaneous closure of the limit switches 98 and 99 as a start signal, it is preferred to perform the reading of the magnetic tape Mt automatically so that the address and retrieval data for each frame recorded on the magnetic tape Mt can be stored in a random access memory RAM provided in the microcomputer 85.

The above described automatic reading system is very useful where the previously described type of microfilm Mf is used, and since the data necessary for the retrieval can be stored in the random access memory RAM immediately after the closure of the cassette cover 2, a necessary retrieval procedure can be immediately performed.

(F) Film Drive Mechanism:

A film drive mechanism is adapted to drive two drive spindles 101 and 102, engageable with take-up and rewinding reels of the film cassette for transporting and rewinding the film, respectively.

Referring now to FIGS. 4 and 19 to 22, particularly to FIGS. 4 and 19, a drive motor 103 having its output shaft mounted with a drive gear 104 of relatively small diameter is positioned, in the form as horizontally laid down, within the casing 4 adjacent one end wall opposite to the slide frame 12. The drive gear 104 is meshed with a gear 107 of relatively great diameter rigidly mounted on one end of a transmission shaft 106 journalled by a bearing 105 so as to extend in parallel relation to the drive shaft of the motor 103, the other end of said transmission shaft 106 having a helical gear 108 mounted thereon for rotation together therewith. The helical gear 108 is in turn meshed with a helical gear 111 rigidly mounted on a support shaft 110 rotatably supported by a support plate 109 through a bearing 112 so as to extend in a direction perpendicular to the support plate 109 as best shown in FIG. 21 and also perpendicular to the transmission shaft 106 as best shown in FIG. 19.

As best shown in FIGS. 21 and 22, a generally elongated rocker plate 113 is provided underneath the support plate 109 for pivotal movement between first and second positions about the support shaft 110 which also extends through the support plate 109. This rocker plate 113 has a pair of spaced switching gears 115 and 116 rotatably mounted thereon through respective support spindles 117 and 118 located adjacent the opposite ends of the rocker plate 113 and on respective sides of the support shaft 110. These switching gears 115 and 116 on the rocker plate 113 are constantly meshed with an intermediate gear 114 rigidly mounted on the support shaft 110 at one end of said shaft 110 remote from the helical gear 111 as best shown in FIG. 21.

On one side of the support plate 109 opposite to the helical gear 111, large-diameter driven gears 119 and 120 are rotatably supported by the support plate 109 in spaced relation to each other and are so positioned that, when the rocker plate 113 is pivoted to the first position, the switching gear 115 can be drivingly engaged with the driven gear 119 as shown in FIG. 22, but when the rocker plate 113 is pivoted to the second position, the switching gear 116 can be drivingly engaged with the driven gear 120. These driven gears 119 and 120 are rigidly mounted on respective shafts 121 and 122 which are in turn rotatably supported by respective bearings 123 and 124 substantially as shown in FIG. 20 and which have respective belt pulleys 125 and 126 rigidly mounted thereon and positioned below the adjacent driven gears 119 and 120 substantially as shown in FIG. 20, it being, however, to be noted that only the driven gear 120 and the associated belt pulley 126 both on the shaft 122 are shown in FIG. 20. These belt pulleys 125 and 126 are drivingly coupled with respective large diameter belt pulleys 127 and 128, rigidly mounted respectively on the drive spindles 101 and 102, by means of respective endless belts 129 and 130 trained therebetween so that the drive spindles 101 and 102 can be driven one at a time by the endless belts 129 and 130 during the rotation of the shafts 121 and 122.

These shafts 121 and 122 having the driven gears 119 and 120 rigidly mounted thereon for selective engagement with the switching gears 115 and 116, respectively, are preferably of a design extending a distance above the associated bearings 123 and 124, as viewed in FIG. 20, with respective bushings 131 and 132 being rigidly mounted on the upper ends of said shafts 121 and 122. Preferably, a friction brake generally identified 135 is employed in association with the bushings 131 and 132. More specifically, the friction brake 135 so far shown comprises a support frame 133 provided with a pair of spaced clamping fingers 133a and 133b, and a strip-like friction spring 134 for elastically holding the respective bushings 131 and 132 in cooperation with the clamping fingers 133a and 133b, and is so designed and so positioned as to apply a predetermined amount of back tension to one of the film shafts which is not driven at the time the film is transported or rewound, thereby to avoid any possible slackening of the film.

While the film drive mechanism is so constructed as hereinabove described, assuming that the horizontally laid drive motor 103 is rotated in one direction or the opposite direction, the intermediate gear 114 on the rocker plate 113 can be rotated in one direction or the opposite direction, respectively. The rotation of the intermediate gear 114 results in the pivotal movement of the rocker plate 113 in a direction dependent on the direction of rotation of the intermediate gear 114 with one of the switching gears 115 and 116 consequently brought into engagement with the associated driven gear 119 or 120. So far shown in FIG. 22, the switching gear 115 is drivingly meshed with the driven gear 119 to drive the spindle 101 through the endless belt 129 to effect the transportation of the microfilm Mf.

Starting from the condition shown in FIG. 22, and assuming that the motor 103 is driven in the reverse direction required to rewind the microfilm, the rocker plate 113 can be pivoted to the second position at which time the switching gear 116 is brought into engagement with the driven gear 120 to drive the spindle 102 thereby to effect the rewinding of the microfilm Mf.

In FIG. 22, reference numeral 136 represents a stopper for restricting the range over which the rocker plate 113 is pivoted between the first and second positions.

In the film drive mechanism of the above described construction, in view of the fact that the drive motor 103 is mounted in the form as horizontally laid down and a gear clutch system of rocking type is employed, the space required for the installation of the film drive system can advantageously be minimized.

Although the present invention has fully bee described in connection with the preferred embodiment thereof with reference to the accompanying drawings, it is to be noted that various changes and modifications are apparent to those skilled in the art. By way of example, although the microfilm has been described as used in the form a roll of microfilm connected with the length of magnetic tape as shown in FIG. 17, it may not be always limited thereto, but may be a usual roll of microfilm or a microfilm generally known as a microfiche.

Accordingly, such changes and modifications are to be understood as included within the true scope of the present invention as defined by the appended claims, unless they depart therefrom.

What is claimed is:

1. A micro-reader in which an optical system is utilized for projecting on a screen a magnified reproduction of an image on a microfilm, said micro-reader comprising:
   a generally rectangular box-like, flattened, casing including opposed side walls;
   a moveable member supported by the casing for movement between longitudinally retracted and extended positions in a direction parallel to the opposed side walls of the casing;

a viewing screen mounted on and supported by the casing for movement between folded and raised positions;

an optical system for projecting the image onto the screen;

a lamp for illuminating the image on the screen; and a reflecting mirror member supported by said moveable member for movement between a laid-down position and an upright position facing said screen for reflecting the imagewise light from the optical system towards the screen when in the upright position and, when at the same time, the screen is held in the erected position, whereby; when the micro-reader is not in use, the screen and the mirror member are held in the retracted, folded and laid-down positions, respectively, said screen and said mirror member constitute cover members for covering the top and bottom of a portion of the space between the casing and the moveable member, but when the micro-reader is in use, the screen and the mirror member are held in the extended raised and upright positions, respectively, and the mirror member confronts the screen at a predetermined angle while lying in a plane different from the plane which is occupied by the mirror member when in the laid-down position.

2. A micro-reader as set forth in claim 1, wherein said casing has a light hole defined in the bottom of said casing, said optical system comprises a condenser lens mounted above said light hole, and a projecting lens assembly for projecting the images born in each frame of said microfilm, illuminated by said lamp, on enlarged scale.

3. A micro-reader as set forth in claim 1, wherein said casing has a light hole defined in the bottom of the casing, said optical system comprises a condenser lens mounted above said light hole, a first projecting lens assembly within said casing for projecting the image on said microfilm onto the screen, a second projecting lens assembly within said casing for projecting a portion of the image onto the screen, a selector for selectively positioning the first lens asembly or the second lens assembly operatively within said optical system relative to said microfilm image, and a scanning mechanism of the second lens assembly for scanning the image on the screen in the vertical and/or horizontal directions so as to magnify a desired portion of the image onto the screen.

4. A micro-reader as set forth in claim 1, further comprising a lamp support member, means for mounting said lamp support member on said casing for movement between a first position within said casing and a second position below the light hole defined in the bottom of the casing.

5. A micro-reader in which an optical system is utilized for projecting on a screen a magnified reproduction of an image on a microfilm, said micro-reader comprising:

a casing, a movable member supported by the casing for movement between longitudinally retracted and extended positions;

a viewing screen mounted on and supported by the casing for movement between folded and raised positions;

an optical system for projecting the image onto the screen;

a lamp for illuminating the image onto the screen;

a reflecting mirror member, mounted on said movable member for movement between a laid-down position and an upright position; facing said screen, said reflecting mirror being operable, when moved to upright position to reflect imagewise light from the optical system towards the screen; and a foldable light shield provided for enclosing the space between the screen and the mirror member when said screen and said mirror member are held in the raised position and the upright position, respectively, said light shield comprising a top panel hingedly connected to the top of the screen and having its opposite sides hingedly connected with respective side panels, such that said top and side panels are capable of being folded together about the respective hinges.

6. A micro-reader in which an optical system is utilized for projecting on a screen a magnified reproduction of an image on a microfilm, said micro-reader comprising:

a casing;

a moveable member having a slide frame and being supported by the casing for longitudinal movement between retracted and extended positions;

a viewing screen mounted on and supported by the casing for movement between folded and raised positions, said screen when in the folded position forming a part of the top wall of the casing;

said moveable member having a groove defined therein so as to open upwards and also towards the direction in which the slide frame is moved from the extended postion towards the retracted position;

a detent mechanism projecting into the groove; and an engagement member carried by the screen and capable of being, when the screen is moved to the folded position, inserted into the groove form above, or from the direction conforming to the direction of movement of the slide frame towards the retracted position, to engage the detent mechanism.

* * * * *